United States Patent Office 2,811,551
Patented Oct. 29, 1957

2,811,551

LONG-CHAIN UNSATURATED DICARBOXYLIC ACIDS AND ESTERS THEREOF

Donald Drake Coffman, West Chester, Pa., and Harry Norman Cripps, Wilmington, Del., assignors to E. I. du Pont de Nemours & Company, Wilmington, Del., a corporation of Delaware No Drawing. Application January 14, 1953,
Serial No. 331,302

15 Claims. (Cl. 260—537)

This invention relates to long-chain organic compounds and, more particularly, to a process of preparing same. Still more particularly, the invention relates to long-chain unsaturated alpha, omega-dicarboxylic acids and their esters, and to the preparation of these compounds. This application is a continuation-in-part of applicants' U. S. application Serial No. 266,115, filed January 11, 1952, and now abandoned.

Long-chain organic compounds are useful in a wide variety of applications. Long-chain difunctional compounds are particularly useful in the preparation of condensation polymers and plasticizers, and as intermediates in various chemical reactions. They can be prepared by a number of methods. However, the heretofore known methods of preparing these long-chain compounds are not satisfactory for the preparation of some symmetrical long-chain difunctional organic compounds which are especially desirable, and, consequently, a new and improved process for preparing them is of considerable practical importance.

An object of the present invention is to provide a new process of preparing long-chain saturated and unsaturated organic compounds. Another object is to provide a new process of preparing long-chain difunctional organic compounds. A further object is to provide a new class of long-chain unsaturated alpha,omega-dicarboxylic acids and their esters. Other objects will be apparent from the description of the invention given hereinafter.

The above objects are accomplished according to the present invention by contacting a polymerizable 1,3-conjugated diene or monoethylenically unsaturated aliphatic ester with a ketone peroxide in the presence of a redox reducing agent, in a solvent for the reactants, the molar ratio of the diene or aliphatic ester to the ketone peroxide being not more than 5 to 1 and the ketone peroxide being a peroxide of a cyclic ketone, ketoester or acyclic diketone. In a more specific embodiment, the invention comprises the preparation of long-chain unsaturated alpha, omega-dicarboxylic acids by contacting a 1,3-conjugated diene with a ketone peroxide, preferably a peroxide of a cyclic ketone, in the presence of a redox reducing agent, in a solvent for the reactants, in a proportion of 1–5 moles of diene per mole of ketone peroxide.

The invention further comprises, as a new class of compounds, those long-chain unsaturated alpha,omega-dicarboxylic acids having two nonconjugated ethylenic double bonds of the formula

HOOC—R'—(C₄H₄R₂)—(C₄H₄R₂)—R'—COOH wherein R is hydrogen, alkyl, alyl, aralkyl, or halogen, and R' is an acyclic saturated hydrocarbon radical having a chain of at least 4 carbon atoms separating the carboxyl and (C₄H₄R₂) groups, and esters of these acids with monohydric alcohols. From the foregoing it will be apparent that these acids have a minimum of 18 carbon atoms, and the esters have a minimum of 20 carbon atoms.

The group (C₄H₄R₂) in the formula above includes the two possible radicals derived from the specific diene selected. For example, the use of butadiene leads to the formation of three isomers:

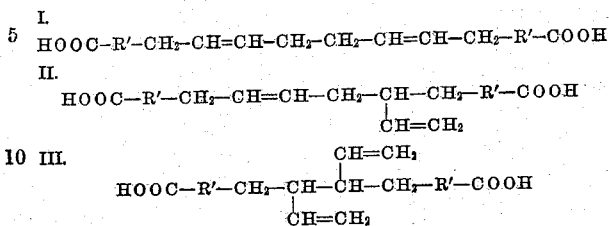

A preferred way of carrying out the process of this invention involves contacting one to five moles of a 1,3-conjugated diene, e. g., 1,3-butadiene, with one mole of a ketone peroxide which is a peroxide of a cyclic ketone, ketoester or acyclic diketone, e. g., cyclohexanone peroxide, or the peroxides of ethyl acetoacetate, acetonylacetone, and the like, in the presence of one mole of a redox reducing agent, i. e., one of the reducing agents commonly used in the redox art, such as ferrous sulfate, in a solvent for the reactants. Preferably, a solution of the ketone peroxide, a second solution containing a stoichiometrically equivalent amount of the reducing agent, and a third solution of the major proportion of the conjugated diene are added gradually and simultaneously with thorough agitation to a solution of a small portion of the diene.

The long-chain compounds obtained by the process of this invention are isolated from the reaction mixture by conventional methods. A generally satisfactory way consists in removing excess volatile reactants by evaporation and then, if an aqueous reaction medium has been employed, extracting the reaction mixture with an organic solvent, e. g., diethyl ether, to separate the product from the aqueous layer. The organic layer can then be dried and fractionally distilled. If the product is a long-chain discarboxylic acid, the type of product formed from certain ketone peroxides, the extract can be treated with dilute aqueous alkali and the aqueous alkaline layer containing the salt of the dicarboxylic acid then acidified. The free acid precipitates from this mixture and is separated from the organic layer by filtration. It is then purified by crystallization from an organic solvent such as petroleum ether or ethyl acetate.

The following examples illustrate specific embodiments of this invention.

*Example I*

A mixture of 100 ml. of distilled water and 100 ml. of reagent grade methanol is placed in a one liter reaction vessel equipped with a high speed stirrer, a condenser cooled by solid carbon dioxide, three calibrated addition funnels, and a thermometer. The mixture is cooled to —20° C., and 20 ml. of liquefied 1,3-butadiene is added slowly. Solutions of 66 g. of cyclohexanone peroxide in methanol (total volume 300 ml.) and 139 g. of reagent grade ferrous sulfate heptahydrate in distilled water (total volume 300 ml.) are added at equal rates over approximately 45 minutes with rapid stirring while the temperature is maintained at —20° C. ±5° C. Simultaneously with these additions, 60 ml. of liquefied 1,3-butadiene is added at such a rate that this addition is complete at the same time as the cyclohexanone peroxide and ferrous sulfate solution additions are completed. After all the reactants are added, the mixture is stirred for another 10 minutes to complete the reaction.

The condenser is removed from the reaction vessel and excess butadiene is allowed to escape as the reaction mixture warms to room temperature. The resulting crude product is extracted from the aqueous layer with four 100 ml. portions of diethyl ether. The ether solution is stirred with 150 ml. of 10% aqueous sodium hydroxide, and the aqueous layer is separated. Acidification of the alkaline layer results in a suspension of a solid in an oily substance which is separated from the aqueous layer. Filtration yields 24 g. of a waxy solid. This solid is purified by boiling in petroleum ether, decanting the clear solution from the oily residue, and chilling the clear solution in solid carbon dioxide. A white powder precipitates. This solid has a melting point of 108–112° C. This product comprises in major proportion 7,11-octadecadiene-1,18-dicarboxylic acid but also contains some material having terminal carbon-carbon unsaturation as judged by the infrared spectra.

Analysis calculated for $C_{20}H_{34}O_4$: C, 71.1%; H, 10.1%; neutral equivalent 169.2. Found: C, 70.6%; H, 10.1%; neutral equivalent 168.3.

This acid forms a di(p-bromophenacyl) ester melting at 116–118° C.

Analysis calculated for $C_{26}H_{44}O_6Br$: C, 59.0%; H, 6.4%; Br, 21.5%. Found: C, 58.96%, 58.71%; H, 6.26%, 6.02%; Br, 22.10%, 22.29%.

There are also isolated from the reaction mixture of this example two other fractions. The first of these is an acidic oil believed to be a polybutadiene of low molecular weight terminated by carboxypentyl groups. The neutral equivalent, 229.4 and molecular weight, 580–625, indicate that an average of 4–6 butadiene groups are present. The second of these fractions is a mixture of neutral compounds which can be separated into cyclohexanone and an unidentified neutral unsaturated compound.

Example II

The process of Example I is repeated with the exception that 64 g. of chloroprene (2-chloro-1,3-butadiene) is substituted for the 1,3-butadiene. There is isolated from the reaction mixture by the procedure of Example I 45 g. of an unsaturated acidic oil. Esterification of this oil with methanol in the presence of sulfuric acid yields an ester product from which about 1 g. boiling at 140–141° C./0.3 mm. is obtained. Analysis indicates this fraction to be the dimethyl ester of a chloroprene dimer having carboxypentyl end groups.

Analysis calculated for $C_{22}H_{36}O_4Cl_2$: C, 60.7%; H, 8.30%; sap. No. 207.7. Found: C, 58.30%, 58.20%, 58.29%; H, 8.41%, 8.46%, 8.40%; sap. No. 203.8, 199.9.

Example III

The process of Example I is repeated with the single exception that 33 g. of cyclopentadiene is substituted for the 1,3-butadiene. On working up the reaction mixture as in the previous examples, there is isolated 26 g. of a brown acidic oil.

Example IV

The process of Example I is repeated with the single exception that 40.9 g. of isoprene is substituted for the 1,3-butadiene. On working up the reaction mixture, there is obtained 50.0 g. of an acidic oil; neut. eq., 202. Calculated for an isoprene dimer with 5-carboxypentyl end groups; neut. eq., 183.

A 38.9 g. portion of this acidic oil is dissolved in purified dioxane and hydrogenated with palladium-on-charcoal catalyst at 80° C. under 2000 lbs./sq. in. hydrogen pressure. There is obtained 40.4 g. of the hydrogenated oil which is treated with methanol and sulfuric acid to give 41.3 g. of the dimethyl ester. On distillation there is isolated 9.8 g. of a yellow oil boiling at 170°–199° C. at 0.3–0.4 mm. A major proportion of this product comprises dimethyl 7,12-dimethyl-7,11-octadecadiene-1,18-dicarboxylate.

Analysis calculated for $C_{24}H_{46}O_4$: C, 72.4%; H, 11.6%; neutral equivalent 199.3. Found: C, 71.16%, 70.90%; H, 11.35%, 11.35%; neutral equivalent 205.8, 206.3; refractive index $n_D^{25}=1.4549$.

Example V

Following the general procedure of Example I, a solution of 45 ml. of liquefied 1,3-butadiene in 100 ml. of nitrogen-saturated methanol is cooled to $-30°$ C. in an atmosphere of nitrogen. An aqueous ferrous sulfate heptahydrate solution (112 ml. of a 1.67 M solution in nitrogen-saturated distilled water) and 38.8 g. (0.186 mole) of hydroxydicarbethoxymethyl hydroperoxide (prepared from ethyl oxomalonate in anhydrous ether) are added simultaneously with vigorous agitation over a 3-minute period. After adding 100 ml. of distilled water, the excess of 1,3-butadiene is allowed to escape from the reaction flask as the mixture is warmed to room temperature. The reaction mixture is extracted with 150 ml. of diethyl ether and the ether extract is washed with 50 ml. of a 10% aqueous sodium bicarbonate solution. After drying with 5 g. of anhydrous magnesium sulfate, the ether solution is distilled to remove the ether and to obtain a pale yellow residue, A, which weighs 17.5 g. A portion of this residue is distilled through a one-foot fractionating column packed with platinum gauze. After removal of 1.4 g. of low boiling material, there are obtained 4.3 g. of material boiling at 160–169° C./11 mm., refractive index, $n_D^{25}$, of 1.4541 (fraction 2), and 4.4 g. of material boiling at 170–179° C./11 mm., $n_D^{25}=$ 1.4549 (fraction 3), and 2.1 g. of higher boiling material having a refractive index of 1.4401. Analysis indicates fraction 2 to be the diethyl ester of a butadiene dimer having carboxyl end groups.

Analysis calculated for $C_{14}H_{22}O_4$: C, 66.3%; H, 8.4%; sap. No. 127; iodine No. 199.5. Found: C, 64.22, 63.70, 64.25%; H, 8.53, 8.48, 8.59; sap. No. 120.9; 117.3; iodine No. 179, 179.

A mixture of 1.07 g. of fraction 3 and 25 ml. of 10% aqueous sodium hydroxide is refluxed for 4 hours under nitrogen atmosphere. Acidification of the pale yellow solution with concentrated hydrochloric acid gives 0.35 g. of a tan solid. Analysis indicates this product to be a decadienedioic acid.

Analysis calculated for $C_{10}H_{14}O_4$: neut. eq., 97.1. Found: neut. eq., 99.8.

A solution of 2.5 g. of the crude yellow residue A of Example V is dissolved in 35 ml. of absolute ethyl alcohol and is hydrogenated at 30–40 lb./sq. in. pressure using 0.1 g. of platinum oxide as catalyst. After filtration of the reaction mixture through a "Celite" mat, the hydrogenated mixture is refluxed for 8 hours with a solution of 3 g. of sodium hydroxide in 50 ml. of distilled water. The black solution obtained is diluted with 15 ml. of distilled water and is treated with two 1 g. portions of decolorizing carbon. Acidification of the alkaline solution yields 1.76 g. of a solid acid. On recrystallization from 100 ml. of distilled water in the presence of decolorizing carbon there are obtained 0.67 g. of white crystals of sebacic acid, M. P. 130.5–132° C. A mixture of this acid with an authentic example of sebacic acid melts at 132–134° C.

Analysis calculated for $C_{10}H_{18}O_4$: neut. eq., 101.1. Found: neut. eq., 102.8, 103.0.

From these results it is clearly evident that the reaction products of hydroxydicarbethoxymethyl hydroperoxide, ferrous ion and 1,3-butadiene are butadiene dimers having carbethoxymethyl end groups and that one of the components of this mixture is diethyl 3,7-decadiene-1,10-dioate.

Example VI

A solution of 53.0 g. (0.190 mole) of ferrous sulfate heptahydrate, 30.8 g. (0.187 mole) of 1-carbethoxy-2-hydroxypropyl-2-hydroperoxide (prepared from equivalent quantities of ethyl acetoacetate and anhydrous ethereal hydrogen peroxide), and 55 ml. of liquefied 1,3-butadiene in 100 ml. of nitrogen-saturated distilled water is reacted under the conditions described in Example V. Isolation of the reaction product in the same manner yields 18.6 g. of a fragrant yellow oil. On distillation of this yellow oil through a 6-inch column, there are obtained 4.11 g. of unreacted ethyl acetoacetate (from the preparation of the ketone peroxide), 4.4 g. of intermediate fraction boiling from 75° C. to 131° C./0.7 mm., and 5.15 g. of product boiling at 131-135° C./0.7 mm. having a refractive index, $n_D^{25}$, of 1.4560. Analysis indicates this fraction to be the diethyl ester of a butadiene dimer having carboxymethyl end groups.

Analysis calculated for $C_{16}H_{26}O_4$: C, 68.05%; H, 9.30%; sap. No., 141.2; quantitative hydrogenation, 0.0142 g. hydrogen/g. of sample. Found: C, 68.16, 67.48, 67.66%; H, 9.28, 9.38, 9.28%; sap No., 143.6, 143.6; quantitative hydrogenation, 0.018, 0.017 g. hydrogen/g. sample.

A 3.80 g. sample of the above unsaturated ester yields on saponification with 1.5 g. of sodium hydroxide dissolved in 25 ml. of distilled water, 2.5 g. of a crude solid acid. Recrystallization of 2 g. of the crude acid from 25 ml. of distilled water and 15 ml. of dioxane yields 1.5 g. of a pure solid acid melting at 159.5-160.5° C. This is a dodecadienedioic acid.

Analysis calculated for $C_{12}H_{18}O_4$: C, 63.69%; H, 8.03; neut. eq., 113.1; quantitative hydrogenation, 0.0177 g. hydrogen/g. of sample. Found: C, 63.92, 93.84%; H, 8.00%; neut. eq., 110.2, 110.0; quantitative hydrogenation, 0.0193 g. hydrogen/g. sample.

A 4.03 g. sample of the 16-carbon unsaturated ester of this example dissolved in 25 ml. of absolute ethyl alcohol absorbs hydrogen in amount corresponding to a pressure drop of 2.5 lb./sq. in. when shaken at 30-40 lb./sq. in. hydrogen pressure with 0.15 g. of platinum oxide catalyst. Theoretical absorption corresponds to a pressure drop of 2.3 lb./sq. in. of hydrogen. Saponification and acidification of the filtered hydrogenation mixture thus obtained yields 2.09 g. of a crude saturated 12-carbon dicarboxylic acid. Recrystallization from 1 l. of water gives 1.0 g. of white needles of 1,12-dodecanedioic acid, M. P. 127.5-128.5° C. There is no depression in melting point when a sample of this acid is mixed with an authentic sample of 1,12-dodecanedioic acid.

Analysis calculated for $C_{12}H_{22}O_4$: neut. eq., 115.1. Found: neut. eq., 113.8, 111.0.

Example VII

A mixture of 55.1 g. of ethyl levulinate and 48.0 g. of 27.9% aqueous hydrogen peroxide, and a solution of 107.0 g. of ferrous sulfate heptahydrate in nitrogen-saturated distilled water (total volume 100 ml.) are added separately and simultaneously with vigorous stirring at −20° C. to −10° C. over a period of four minutes to a solution of 110 ml. of liquid 1,3-butadiene in 100 ml. of nitrogen-saturated methanol. There is obtained 44.6 g. of crude neutral product which, on distillation, yields 32.8 g. of recovered ethyl levulinate and 9.6 g. of a higher boiling residue. This residue contains in major proportion the diethyl 5,9-tetradecadiene-1,14-dioate. This residue is dissolved in ethanol and is hydrogenated at 30-40 lb./sq. in. hydrogen pressure, using platinum oxide catalyst. Saponification of the resultant hydrogenated mixture yields 4.5 g. of crude 1,14-tetradecanedioic acid, M. P. 123-125° C. After two recrystallizations from ethyl acetate, the acid melts at 125-126° C. The melting point of this acid as recorded in the literature (Helv. Chim. Acta. 9, 264 (1926)) is 125.8° C.

Analysis calculated for $C_{14}H_{26}O_4$: neut. eq., 129.2. Found: neut. eq., 132.0.

Example VIII

A mixture of 57.14 g. of acetonylacetone and an equivalent amount of aqueous 27% hydrogen peroxide (63.0 g.), a solution of 139 g. of ferrous sulfate heptahydrate in nitrogen-saturated distilled water (total volume 200 ml.), and a solution of 94 g. of liquid 1,3-butadiene in 150 ml. of nitrogen-saturated methanol are reacted under the conditions described in Example VII. The reaction mixture is extracted with ether to separate the organic materials from the ferric salts and, after evaporation of the ether from the organic fraction, there is obtained 25 g. of a colorless liquid. This product is combined with a similar product obtained in another run carried out under the same conditions. From 41.5 g. of combined product there are obtained by distillation 6.5 g. of recovered acetonylacetone; 4.7 g. of intermediate fractions boiling from 130° C./0.5 mm. to 139° C./0.55 mm.; fraction 4, 4.9 g., boiling at 145° C./0.55 mm., $n_D^{25}$, 1.4728; fraction 5, 5.1 g., boiling at 145-150° C./0.55-0.58 mm., $n_D^{25}$, 1.4700; and fraction 6, 2 g., boiling at 152-154° C./0.58 mm., which is a solid. Analyses indicate that fractions 4, 5, and 6 are 16-carbon diketones consisting of butadiene dimers having 3-ketobutyl end groups.

| Analyses | Calculated for $C_{16}H_{26}O_2$ | Found—Fraction 4 | Found—Fraction 5 | Found—Fraction 6 |
|---|---|---|---|---|
| C percent | 76.76 | 74.41 / 74.42 | 75.49 / 75.85 | 75.42 / 74.99 |
| H do | 10.46 | 10.31 / 10.23 | 10.29 / 10.34 | 10.23 / 10.14 |
| Quantitative hydrogenation, 0.0159 g. hydrogen/g. sample | | 0.0191 | 0.0202 / 0.0185 | 0.0179 / 0.0171 |

A solution of 4.19 g. of fraction 5 in 25 ml. of absolute ethyl alcohol is hydrogenated at 30-40 lb./sq. in. pressure, using 0.1 g. of platinum oxide catalyst. After removal of catalyst, the ethanol is evaporated to obtain a residue which is a white solid. This solid is recrystallized from a mixture of 15 ml. of ethyl alcohol and 10 ml. of water, giving 2.38 g. of white plates A, melting at 76-80.5° C. Recrystallization of A from 25 ml. of methanol yields 1.25 g. of white plates B, melting at 85-87.5° C.

Analysis of B: Calculated for $C_{16}H_{30}O_2$: C, 75.55%; H, 11.88%; mol wt., 254.4. Found: C, 75.11, 75.38%; H, 11.88, 11.67%; mol. wt., 248, 248.

These results are in excellent agreement with the theoretical composition of a hexadecanedione.

Example IX

The process of Example V is carried out with 47.0 g. of 1-carbethoxy-3,3,3-trifluoro-2-hydroxypropyl-2-hydroperoxide (prepared from ethyl trifluoroacetoacetate and hydrogen peroxide), a solution of 61.0 g. of ferrous sulfate heptahydrate dissolved in nitrogen-saturated distilled water to a volume of 100 ml., and 60 ml. of liquid 1,3-butadiene. The reaction product, isolated as in Examples V and VI, amounts to 38.3 g. of a colorless oil. After removal of unreacted ethyl trifluoroacetoacetate by distillation, there are obtained 2.9 g. of an intermediate fraction boiling from 83° C. to 141° C. at 1.8-2.0 mm., 7.7 g. of fraction 4 boiling at 145-146° C./1.5-2.0 mm., $n_D^{25}$, 1.4488, and 8.1 g. of fraction 5 boiling at 148-152° C./1.7 mm., $n_D^{25}$, 1.4508. Fractions 4 and 5 comprise in major proportions the ethyl esters of butadiene dimers having carboxymethyl end groups.

A solution of 6.66 g. of fraction 4 in ethanol is hydrogenated at 30-40 lb./sq. in. hydrogen pressure, using 0.1 g. of platinum oxide catalyst. Hydrolysis of the resultant hydrogenation mixture yields 2.5 g. of crude dodecanedioic acid melting at 104-109° C. Recrystallization of this crude acid yields pure 1,12-dodecanedioic acid, melting at 128.5-130° C. This pure acid when mixed with an authentic sample of 1,12-dodecanedioic acid shows no depression in melting point.

Example X

A solution of 66.0 g. (0.5 mole) of cyclohexanone peroxide in methanol (total volume 300 ml.) and a solution of 139 g. (0.5 mole) of ferrous sulfate heptahydrate in water (total volume 300 ml.) are added with vigorous agitation at equivalent rates to a solution of 86.1 g. (0.5 mole) of diethyl fumarate in 100 ml. of methanol over a 10-minute period at a temperature of 0° C. in an atmosphere of nitrogen. After one-half of the peroxide and ferrous sulfate solutions are added, a solution of 86.1 g. (0.5 mole) of ethyl fumarate in 100 ml. of methanol is added concurrently with the remainder of the other solutions. The reaction mixture is extracted with diethyl ether to remove the organic products, and the ether extracts are agitated with a solution of 55 g. of sodium carbonate in 500 ml. of water. The organic and aqueous layers are then separated. Acidification of the sodium carbonate extract yields 80.7 g. of a clear white oil which is believed to contain some 7,8,9,10-tetracarbethoxy-hexadecanedioic acid.

Analysis calculated for $C_{28}H_{46}O_{12}$: C, 58.5%; H, 8.0%; Sap. No., 95.7. Found: C, 56.98, 57.16%; H, 7.78, 7.74%; Sap. No., 151.1, 152.9.

Esterification of 50.0 g. of the crude product with 200 ml. of absolute ethanol using 1 ml. of concentrated sulfuric acid as catalyst yields 48.8 g. of crude ester. On molecular distillation of the crude ester there are obtained the following fractions:

| Fraction (No.) | B. P. (°C.) | Pressure (microns Hg) | Weight (g.) | $n_D^{25}$ |
| --- | --- | --- | --- | --- |
| 1 | 95–100 | <5 | 3.5 | 1.4448 |
| 2 | 110–115 | <5 | 7.5 | 1.4501 |
| 3 | 140–145 | <5 | 7.0 | 1.4561 |
| 4 | 160–165 | <5 | 11.5 | 1.4585 |
| R | Pot | Residue | 8.0 | |

| Analysis | Calculated for $C_{32}H_{54}O_2$ | Found— Fraction 3 | Found— Fraction 4 |
| --- | --- | --- | --- |
| C percent | 60.9 | 59.86, 59.63 | 59.78, 59.42 |
| H do | 8.6 | 8.38, 8.29 | 8.22, 8.22 |
| Mol. Wt | 630.5 | 485, 530 | 630, 625, 700 |

Distillation and analytical data indicate that the crude esterified product is heterogeneous but is primarily the desired 1,6,7,8,9,14-hexacarbethoxytetradecane.

*Example XI*

A mixture of 65.0 g. (0.5 mole) of ethyl acetoacetate and 62.2 g. (0.5 mole) of 27.4% aqueous hydrogen peroxide, and a solution of 139 g. (0.5 mole) of ferrous sulfate heptahydrate dissolved in water (total volume 200 ml.) are added with vigorous agitation at equivalent rates to a solution of 43.0 g. (0.5 mole) of vinyl acetate in 150 ml. of methanol over a period of 15 minutes while the temperature is maintained at 0°±15° C. After one-half of the reactants have been added, an additional 43.1 g. (0.5 mole) of vinyl acetate is added concurrently with the remainder of the reactants. The product, isolated from the reaction mixture by ether extraction, is a pale yellow oil amounting to 69.8 g. This product is believed to contain diethyl 4,5-diacetoxyoctanedioate. The product yields the following fractions on distillation:

| Fraction (No.) | B. P. (° C.) | Pressure (mm. Hg) | Weight (g.) | $n_D^{25}$ |
| --- | --- | --- | --- | --- |
| 1 | 43–60 | 0.35–0.40 | 2.5 | 1.4218 |
| 2 | 60–110 | 0.32–0.35 | 3.4 | 1.4341 |
| 3 | 115–120 | 0.28 | 2.6 | 1.4593 |
| 4 | 120–127 | 0.28–0.35 | 1.1 | 1.4646 |
| 5 | 110–121 | 0.28 | 1.2 | 1.4750 |

Analysis calculated for $C_{16}H_{26}O_8$: Sap. No., 86.6. Found: Fraction 3, Sap. No., 96.2, 91.3; Fraction 4, Sap. No., 92.4, 90.1.

It will be understood that the above examples are merely illustrative and that the present invention broadly comprises the process as hereinbefore defined. The invention also comprises, as new compounds, those long-chain unsaturated alpha,omega-dicarboxylic acids having two nonconjugated ethylenic double bonds, as hereinbefore defined, and the esters of these acids with monohydric alcohols. For example, these dicarboxylic acids can be esterified by conventional methods with monohydric alcohols, e. g., methanol, ethanol, 1- and 2-butanol, and cyclohexanol.

The process of this invention is applicable to ketone peroxides generally, including peroxides of cyclic and acyclic ketones free of other functional groups, e. g., peroxides of mono- and diketones, and of ketones having other functional groups, e. g., ketoesters, hydroxy ketones, and unsaturated ketones.

Specific acyclic ketone peroxides other than those used in the examples, well adapted for use in the process, include the peroxides of the 1,3-diketones, e. g., acetylacetone; of the 1,4-diketones, e. g., acetonylacetone; and ketoesters such as, for example, methyl trifluoroacetoacetate, n-butyl oxomalonate, cyclohexyl acetoacetate, and n-dodecyl levulinate. The peroxides of ketoesters are especially useful in the process of this invention, and are, therefore, a preferred embodiment.

Specific cyclic ketone peroxides, other than cyclohexanone peroxide, well adapted for use in the process, include the peroxides of cyclopentanone, 2-methylcyclopentanone, 2-, 3-, and 4-methylcyclohexanone, 2,4-dimethylcyclohexanone, cycloheptanone, cyclooctanone, cyclodecanone, cyclododecanone, cyclooctadecanone, and cycloeicosanone. Peroxides of cyclic ketones having 5 to 8 annular carbon atoms, inclusive, are also especially preferred in the process of this invention.

The ketone peroxides used in the instant process can be prepared by known methods. For example, the ketones can be reacted with hydrogen peroxide as described in J. Am. Chem. Soc. 68, 533 (1946) and in U. S. Patent 2,298,405. They can also be prepared by other methods such as, for example, by treating a secondary alcohol, such as cyclohexanol or 2-butanol, with molecular oxygen, preferably in the presence of a free radical liberating initiator. For example, cyclohexanol can be treated with molecular oxygen at 60–85° C. using an azonitrile catalyst and adding calcium carbonate. Secondary alcohols can also be treated with molecular oxygen in the presence of ultraviolet light with or without the addition of benzoin or other photoinitiator.

It is not essential that the ketone peroxide be prepared and isolated before reacting it with the ethylenically unsaturated compound and the redox reducing agent. If desired, a mixture of the ketone and hydrogen peroxide can be added simultaneously with the other reactants.

Peroxides formed from cyclic ketones of the general formula

wherein R is a divalent hydrocarbon radical having 4 to 20 carbon atoms, inclusive, in the chain, will generally be used in the embodiment of the process of this invention involving use of cyclic ketone peroxides, those wherein R is a divalent hydrocarbon radical having four to eight carbons in the divalent hydrocarbon radical, being especially useful.

The ketone peroxides are believed to exist in different structural forms. Some of these different forms are indicated by the following formulas for cyclic ketone peroxides.

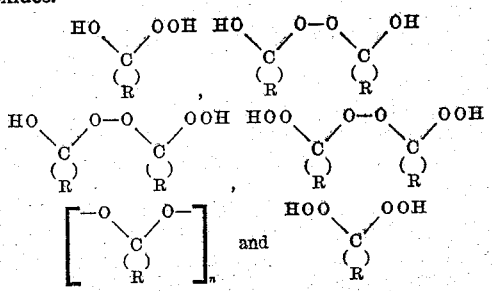

Some of the compounds represented by these formulas may be in equilibrium with others with the relative proportions of each being dependent on the particular environment of the peroxide. A cycle ketone peroxides also exist in the same peroxide structures. In the reaction of this invention the ketone peroxides are believed to react in the form of the 1-hydroxy-1-hydroperoxide, i. e., the structures

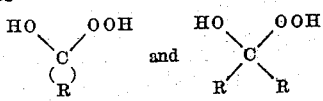

In addition to the specific unsaturated compounds illustrated in the examples, other polymerizable 1,3-conjugated dienes or monoethylenically unsaturated aliphatic esters can be used in the process of this invention. Specific examples of suitable monoethylenically unsaturated aliphatic esters include dimethyl maleate and vinyl acetate. Specific examples of suitable 1,3-conjugated dienes include aliphatic and cycloaliphatic conjugated dienes, such as 1,3-cyclohexadiene, 1,3-pentadiene, 2,3-dimethyl-1,3-butadiene, 2,3-dichloro-1,3-butadiene, 2-fluoro-1,3-butadiene, and 2-phenyl-1,3-butadiene.

The specific compounds of the new class forming a part of this invention include, in addition to the dicarboxylic acids of the examples, 6,7,10,11-tetramethyl-6,10-hexadecadiene-1,16-dicarboxylic acid, 3,16-dimethyl-7,11-octadecadiene-1,18-dicarboxylic acid, 9,10,13,14-tetrachloro-9,13-docosadiene-1,22-dicarboxylic acid, and 8,12-eicosadiene-1,20-dicarboxylic acid. Specific examples of esters of this invention include dimethyl 7,11-octadecadiene-1,18-dicarboxylate, diethyl 8,12-eicosadiene-1,20-dicarboxylate, and dicyclohexyl 3,16-dimethyl-7,11-octadecadiene-1,16-dicarboxylate.

The redox reducing agents used in this invention are those reducing agents commonly employed in the redox art. The term "redox" is here used in its accepted sense to denote oxidation-reduction reactions in which an electron transfer occurs with the simultaneous formation of a free radical. In order for this free radical formation to occur, there must be present a substance which acts as the reducing agent for the peroxide compound, i. e., the peroxide of the ketone. Suitable redox reducing agents include the heavy metals capable of existing in several valence states such as iron, cobalt, manganese, copper, chromium and the like, as well as 1-ascorbic acid, sodium formaldehyde sulfoxylate, sodium bisulfite, the reducing sugars, and other reducing agents commonly used in the redox art.

The ketone peroxide and the reducing agent are preferably used in substantially stoichiometric proportions since a controlled degree of reduction is desired. Excess reducing agent tends to result in a decrease in the yield of desired addition product. The ethylenically unsaturated reactant is preferably used in excess of the amount stoichiometrically equivalent to the ketone peroxide being used, but is not used in excess of five moles of ethylenically unsaturated compound per mole of ketone peroxide. When less than one mole of unsaturated compound per mole of ketone peroxide is used, the direct coupling of two radicals from the peroxide tends to occur. When too large an excess of the unsaturated reactant is used, that is, when more than five moles of unsaturated reactant are used, higher molecular weight products result from the formation of trimers and higher polymers of the unsaturate which then unite with terminal units derived from the ketone peroxide.

Instead of a stoichiometric amount of ferrous ion, the process of this invention can, if desired, be carried out with a trace of a multivalent metal such as, for example, ferrous or ferric ion, together with another of the above-mentioned reducing agents in an amount stoichiometrically equivalent to the ketone peroxide, which serves to convert the ferric ion to ferrous ion as fast as the ferric ion is formed. In this type of process, the heavy metal may be thought as a promoter. Ferrous ion is preferred as such or as the promoter because of its efficiency and low cost.

Temperatures used in this process are not critical, and may vary over a wide range, depending on the particular reactants being employed. Temperatures of from −100° C. to 100° C. or higher are operable. The temperature selected in any particular case should, of course, be below the decomposition temperature of any reactants being used and below the temperature at which undesirable side reactions take place. For example, when butadiene is used as the conjugated diene, it is preferred to use temperatures of about −20° C. in order to keep the volatile butadiene in the reaction system at atmospheric pressure. Of course, higher temperatures can be used with butadiene if the reaction is carried out in a closed container under pressure. Likewise, reaction temperatures below 0° C. are preferred when chloroprene is used, in order to minimize polymerization of this particular diene.

The reaction time likewise is not critical. Generally, at least fifteen minutes are required for the complete addition of all the reactants and reaction times of about one hour give good results. However, longer times can be used if desired.

The dicarboxylic acids and esters of this invention are useful in many applications. They are especially useful as ingredients for the preparation of condensation polymers, for example, for condensation with difunctional alcohols and amines to form polyesters and polyamides. They are also useful as intermediates for the preparation of plasticizers and as surface-active agents. The presence of two nonconjugated ethylenic bonds in the dibasic acids and esters of this invention also render them useful as intermediates for reaction with compounds which add to double bonds. The diketones of this invention are useful as intermediates to long-chain dicarboxylic acids obtained by oxidation of the ketones and as intermediates to ligands formed by acetylation of the bis(methyl ketones).

As many apparently widely different embodiments of this invention may be made without departing from the spirit and scope thereof, it is to be understood that the invention is not limited to the specific embodiments thereof except as defined in the appended claims.

The invention claimed is:

1. Long-chain unsaturated alpha,omega-dicarboxylic acids and esters thereof, having two nonconjugated ethylenic double bonds, of the formula

R"OOC—R'—(C₄H₄R₂)—(C₄H₄R₂)—R'—COOR"

wherein R is from the group consisting of hydrogen, chlorine, and methyl, R' is an acyclic saturated hydrocarbon radical having a chain of 4 to 7 carbon atoms separating the carboxyl and (C₄H₄R₂) groups, and R" is from the group consisting of hydrogen and saturated hydrocarbon radicals of up to 6 carbon atoms.

2. 7,11-octadecadiene-1,18-dicarboxylic acid.

3. Process of preparing long-chain dicarbonyl compounds which comprises contacting a polymerizable ethylenically unsaturated compound selected from the group consisting of 1,3-conjugated dienes and monoethylenically unsaturated aliphatic esters with a ketone peroxide selected from the group consisting of peroxides of cyclic ketones, peroxides of ketoesters and peroxides of acyclic diketones in the presence of a redox reducing agent, in a solvent for the reactants, the molar ratio of said ethylenically unsaturated compound to said ketone peroxide being from substantially 1:1 up to 5:1 to form a dicarbonyl compound consisting of a dimer of the ethylenically unsaturated compound coupled at each end to a carbonyl terminal unit from the ketone peroxide.

4. Process as set forth in claim 3 wherein said peroxide and said redox reducing agent are present in substantially stoichiometric proportions.

5. Process as set forth in claim 4 wherein said ethylenically unsaturated compound is a 1,3-conjugated diene.

6. Process as set forth in claim 4 wherein said peroxide is a peroxide of a cyclic ketone.

7. Process as set forth in claim 4 wherein said peroxide is a peroxide of a cyclic ketone having 5 to 8 annular carbon atoms, inclusive.

8. Process as set forth in claim 4 wherein said peroxide is a peroxide of a ketoester.

9. Process of preparing a long-chain unsaturated alpha,omega-dicarboxylic acid which comprises contacting a 1,3-conjugated diene with a peroxide of a cyclic ketone in the presence of a redox reducing agent, in a solvent for the reactants.

10. Process as set forth in claim 9 wherein said diene is present in a proportion of 1 to 5 moles per mole of peroxide, and said peroxide and said redox reducing agent are present in substantially stoichiometric proportions.

11. Process of preparing a long-chain unsaturated alpha,omega-dicarboxylic acid which comprises contacting 1,3-butadiene with a peroxide of a cyclic ketone in the presence of a redox reducing agent, in a solvent for the reactants.

12. Process as set forth in claim 11 wherein said butadiene is present in a proportion of 1 to 5 moles per mole of peroxide, and said peroxide and said redox reducing agent are present in substantially stoichiometric proportions.

13. Process of preparing a long-chain unsaturated alpha,omega-dicarboxylic acid which comprises contacting 1,3-butadiene with cyclohexanone peroxide in the presence of a redox reducing agent, in a solvent for the reactants.

14. Process as set forth in claim 13 wherein said butadiene is present in a proportion of 1 to 5 moles per mole of peroxide and said peroxide and said redox reducing agent are present in substantially stoichiometric proportions.

15. Process as set forth in claim 14 wherein said redox reducing agent is ferrous sulfate and said solvent is aqueous methanol.

References Cited in the file of this patent

UNITED STATES PATENTS

| | | |
|---|---|---|
| 2,175,843 | Kuhn et al. | Oct. 10, 1939 |
| 2,352,461 | Walker | June 27, 1944 |
| 2,360,673 | Hanford | Oct. 17, 1944 |
| 2,402,873 | Coffman et al. | June 25, 1946 |
| 2,433,015 | Roland et al. | Dec. 23, 1947 |
| 2,433,016 | Coffman et al. | Dec. 23, 1947 |
| 2,436,269 | Scott | Feb. 17, 1948 |
| 2,601,223 | Roedel | June 24, 1952 |
| 2,680,713 | Lindsey et al. | June 8, 1954 |

OTHER REFERENCES

Kuhn et al.: Beilstein (Handbuch, 4th ed.), vol. 2, p. 677 (1942).